United States Patent
Torigoe et al.

(10) Patent No.: US 8,103,939 B2
(45) Date of Patent: Jan. 24, 2012

(54) STORAGE SYSTEM AND DATA STORAGE METHOD

(75) Inventors: Osamu Torigoe, Odawara (JP); Hideaki Fukuda, Odawara (JP)

(73) Assignee: Hitachi, Ltd., Tokyo (JP)

( * ) Notice: Subject to any disclaimer, the term of this patent is extended or adjusted under 35 U.S.C. 154(b) by 908 days.

(21) Appl. No.: 12/155,207

(22) Filed: May 30, 2008

(65) Prior Publication Data

US 2009/0249173 A1    Oct. 1, 2009

(30) Foreign Application Priority Data

Mar. 28, 2008   (JP) ................................. 2008-085776

(51) Int. Cl.
*G06F 11/00* (2006.01)

(52) U.S. Cl. ...................... 714/766; 714/6.24
(58) Field of Classification Search ................ 714/6.1, 714/6.2, 6.24, 766, 801
See application file for complete search history.

(56) References Cited

U.S. PATENT DOCUMENTS

| | | | | |
|---|---|---|---|---|
| 5,638,385 A | * | 6/1997 | Fifield et al. | 714/763 |
| 6,701,480 B1 | * | 3/2004 | Karpuszka et al. | 714/764 |
| 7,136,973 B2 | * | 11/2006 | Sinclair | 711/156 |
| 7,225,308 B2 | * | 5/2007 | Melament et al. | 711/162 |
| 7,865,761 B1 | * | 1/2011 | Chilton | 714/2 |
| 2005/0138284 A1 | * | 6/2005 | Cohn et al. | 711/114 |
| 2007/0050571 A1 | | 3/2007 | Nakamura et al. | |
| 2008/0086585 A1 | * | 4/2008 | Fukuda et al. | 711/100 |
| 2009/0037644 A1 | * | 2/2009 | Miller | 711/103 |
| 2009/0132760 A1 | * | 5/2009 | Flynn et al. | 711/113 |
| 2011/0208933 A1 | * | 8/2011 | Selfin et al. | 711/162 |

FOREIGN PATENT DOCUMENTS

JP    2007-066129    9/2005

* cited by examiner

*Primary Examiner* — Marc Duncan
(74) *Attorney, Agent, or Firm* — Stites & Harbison PLLC; Juan Carlos A. Marquez, Esq.

(57) ABSTRACT

The storage system includes a first memory device configured to store data sent from a host system, a first memory device controller configured to control read/write access of the data from/to the first memory device, an arithmetic circuit unit configured to calculate parity data based on the data, a second memory device configured to store the parity data, a second memory device controller configured to control read/write access of the parity data from/to the second memory device. With this storage system, read access speed of the first memory device is faster than read access speed of the second memory device.

10 Claims, 22 Drawing Sheets

FIG.6

| DATA NAME | MEMORY ADDRESS | DATA LENGTH | PARITY GROUP NUMBER | LOGICAL VOLUME NUMBER | FLASH MEMORY NUMBER/ HARD DISK NUMBER | ADDRESS |
|---|---|---|---|---|---|---|
| D1 | 10 | 10 | 1 | 1 | 1 | 20 |
| D2 | 20 | 10 | 1 | 1 | 2 | 20 |
| D3 | 30 | 10 | 1 | 1 | 3 | 20 |
| D4 | 40 | 10 | 1 | 1 | 4 | 20 |
| P1 | 50 | 5 | 1 | 1 | 1 | 20 |
| D5 | 55 | 20 | 2 | 2 | 5 | 35 |
| D6 | 70 | 20 | 2 | 2 | 6 | 35 |
| ... | ... | ... | ... | ... | ... | ... |

MANAGEMENT TABLE 381

FIG.13

| PARAMETER | DESCRIPTION OF COMMAND |
|---|---|
| CMD | DESCRIPTION OF ARITHMETIC METHOD |
| CCMADR | READ ADDRESS OF DATA TO BE OPERATED |
| NCMADR | WRITE ADDRESS OF DATA AFTER OPERATION |
| LENGTH | DATA LENGTH OF DATA TO BE OPERATED |
| STRADR | END STATUS |
| PRM | FUNCTION COEFFICIENTS TO BE USED IN OPERATION OF PARITY DATA |
| LRC | GUARANTEE CODE OF PARAMETER |
| ⋮ | ⋮ |

FIG.19

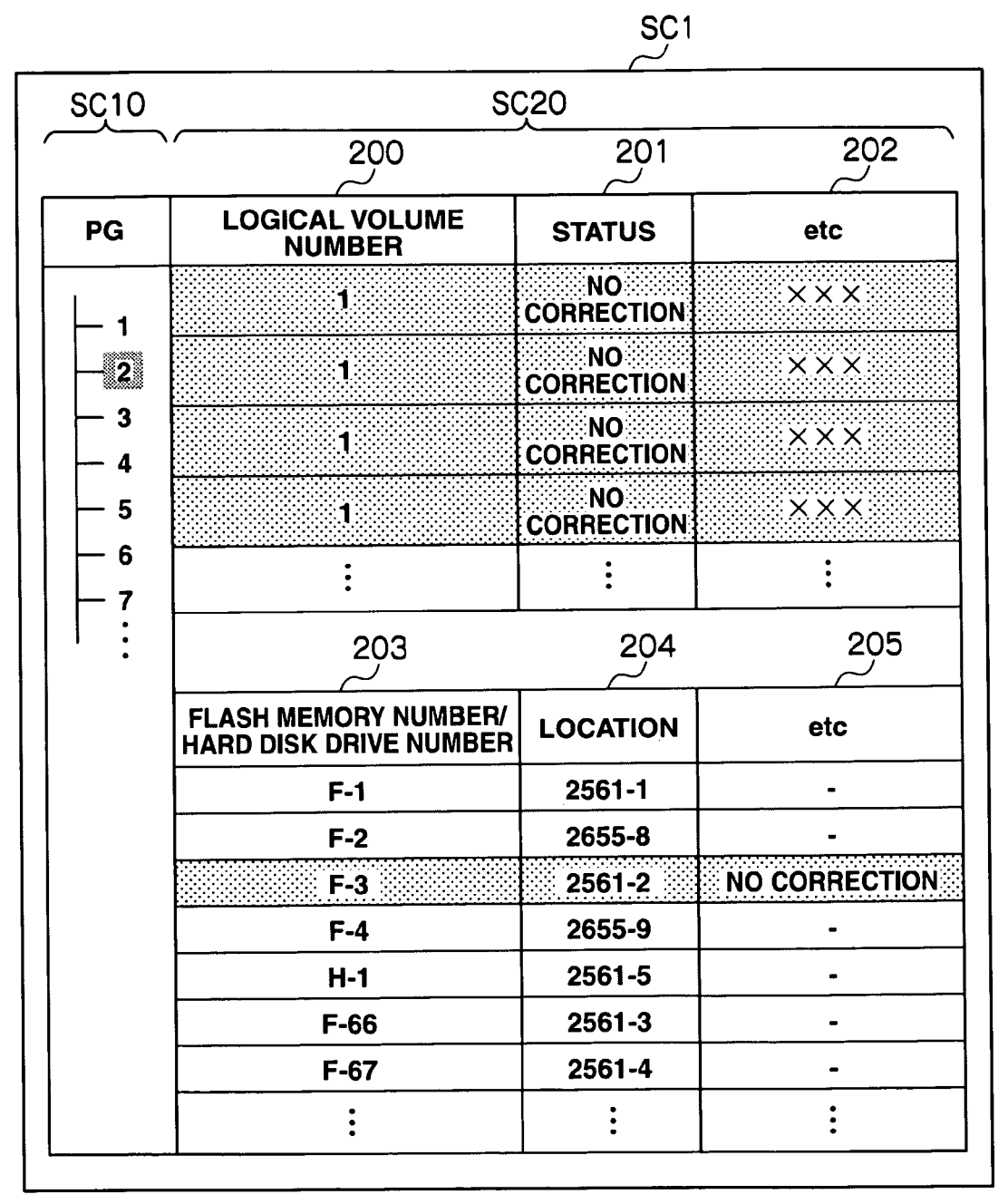

| PG | LOGICAL VOLUME NUMBER | STATUS | etc |
|---|---|---|---|
| 1 | 1 | NO CORRECTION | ××× |
| 2 | 1 | NO CORRECTION | ××× |
| 3 | 1 | NO CORRECTION | ××× |
| 4 | | | |
| 5 | 1 | NO CORRECTION | ××× |
| 6 | ⋮ | ⋮ | ⋮ |
| 7 | | | |

| FLASH MEMORY NUMBER/ HARD DISK DRIVE NUMBER | LOCATION | etc |
|---|---|---|
| F-1 | 2561-1 | - |
| F-2 | 2655-8 | - |
| F-3 | 2561-2 | NO CORRECTION |
| F-4 | 2655-9 | - |
| H-1 | 2561-5 | - |
| F-66 | 2561-3 | - |
| F-67 | 2561-4 | - |
| ⋮ | ⋮ | ⋮ |

STORAGE SYSTEM AND DATA STORAGE METHOD

CROSS-REFERENCES

This application relates to and claims priority from Japanese Patent Application No. 2008-085776, filed on Mar. 28, 2008, the entire disclosure of which is incorporated herein by reference.

BACKGROUND

The present invention generally relates to a storage system and a data storage method, and in particular can be suitably applied to a storage system that uses a flash memory as its memory device.

In recent years, hard disk drives are becoming mainstream as the memory device of storage systems. Accordingly, technical innovation concerning hard disk drives is consistently pursued, and the storage capacity per unit area of hard disks is increasing drastically. In addition, reliability is also improving as a result of managing a plurality of hard disk drives in RAID (Redundant Array of Independent/Inexpensive Disks) format. Nevertheless, the read response of hard disk drives is slow at several ms or longer, and this slow read response is the bottleneck in the performance of storage systems using hard disk drives.

In order to overcome this bottleneck, recently, a flash memory as a semiconductor memory capable of freely rewriting data and in which data is not lost even when the power is turned off is being widely used as the memory device. The read response of a flash memory is 30 to 40 times faster than the read response of hard disk drives. Pursuant to the diffusion of such flash memories, the cost per unit bit thereof is decreasing.

In the future, it is anticipated that storage systems mounting flash memories as the memory device will appear in the market. As a result of adopting this kind of configuration, the creation of a storage system with a fast access speed and with low power consumption can be conceived.

Japanese Patent Laid-Open Publication No. 2007-66129 proposes a storage system mounting both a flash memory and a hard disk drive.

SUMMARY

A flash memory only guarantees a write count of roughly 100,000 times. Thus, when using a flash memory as the memory device of a storage system, a failure in the flash memory is anticipated to occur frequently unless measures giving consideration to such characteristic of flash memories are taken. Consequently, unless measures are taken, not only will the operation cost of the storage system increase drastically due to tremendous amounts of money and labor required for replacing the flash memories, reliability of the storage system may also be lost from the perspective of data protection.

Thus, an object of the present invention is to provide a storage system and a data storage method capable of prolonging the life of a system by mounting a flash memory having a fast read response in a storage system and limiting the write count of such flash memory.

In order to achieve the foregoing object, the present invention provides a storage system comprising a first memory device configured to store data sent from a host system, a first memory device controller configured to control read/write access of the data from/to the first memory device, an arithmetic circuit unit configured to calculate parity data based on the data, a second memory device configured to store the parity data, a second memory device controller configured to control read/write access of the parity data from/to the second memory device. With the storage system, read access speed of the first memory device is faster than read access speed of the second memory device.

Consequently, since the storage of parity data to be updated each time the data is updated can be concentrated in the second memory device, normal data can be read from the first memory device having a faster read response than the second memory device.

The present invention additionally provides a method of storing data in a storage system. This method of storing data comprises the steps of storing, under control of a first controller, data sent from a host system in a first memory device, calculating, under control of an arithmetic circuit, parity data based on the data, storing, under control of a second controller, the parity data in a second memory device. With the method of storing data in a storage system, read access speed of the first memory device is faster than read access speed of the second memory device.

Consequently, since the storage of parity data to be updated each time the data is updated can be concentrated in the second memory device, normal data can be read from the first memory device having a faster read response than the second memory device.

According to the present invention, it is possible to prolong the life of a system by mounting a flash memory having a fast read response in a storage system and limiting the write count of such flash memory.

DESCRIPTION OF DRAWINGS

FIG. 6 is a chart showing management table according to the first embodiment;

FIG. 13 is a chart explaining parameters according to the first embodiment;

FIG. 19 is a diagram showing a management screen when a failure occurs in the first embodiment;

DETAILED DESCRIPTION

An embodiment of the present invention is now explained in detail with reference to the attached drawings.

Figure 1:
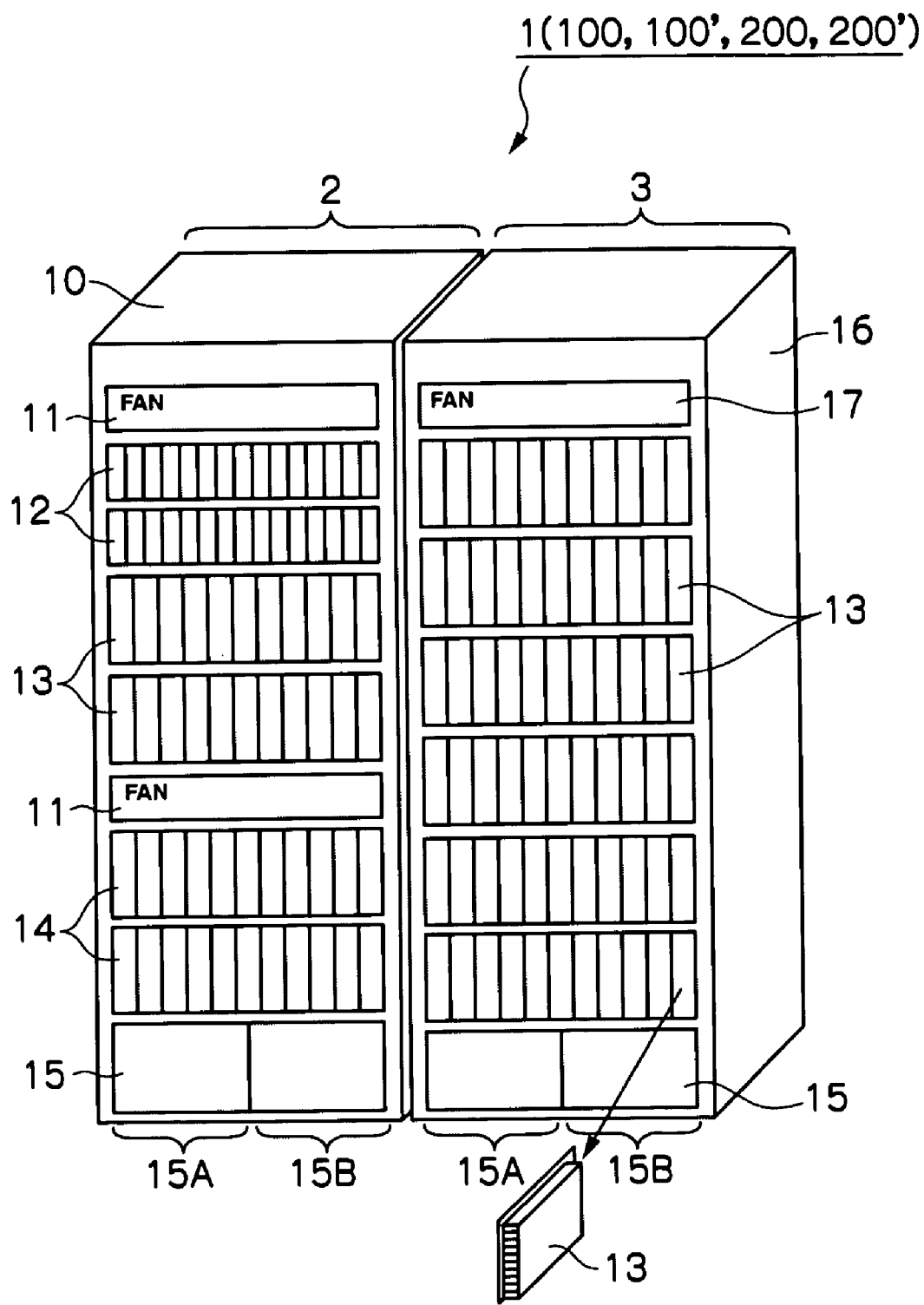
FIG. 1 is a perspective view showing the exterior configuration of a storage system according to the first embodiment.

(1) Configuration of Storage System in Present Embodiment (1-1) Exterior Configuration of Storage System FIG. 1 shows the overall storage system 1 according to the present embodiment. The storage system 1 comprises a storage controller 2 loaded with a data I/O control function for performing I/O control of data, and a storage apparatus 3 housing a plurality of flash memory packages 13.

The storage controller 2 is configured by housing a plurality of cooling fan units 11, hard disk drive units 12, flash memory packages 13, logical substrates 14 and power source battery units 15 in a rectangular rack frame 10.

The cooling fan unit 11 is a unit housing one or more fans, and is used for discharging the heat generated from the flash memory packages 13, the hard disk drive units 12, the logical substrates 14 and the like outside the rack frame 10.

The hard disk drive unit 12 is configured, for instance, by a 3.5-inch hard disk drive being housed in a chassis of a prescribed size. A connector (not shown) is provided to the rear end side of the chassis, and the hard disk drive unit 12 can be mounted on a backboard (not shown) in a physically and electrically connected state by connecting the foregoing connector to a connector (not shown) of the backboard mounted on the rack frame 10.

Figure 2:
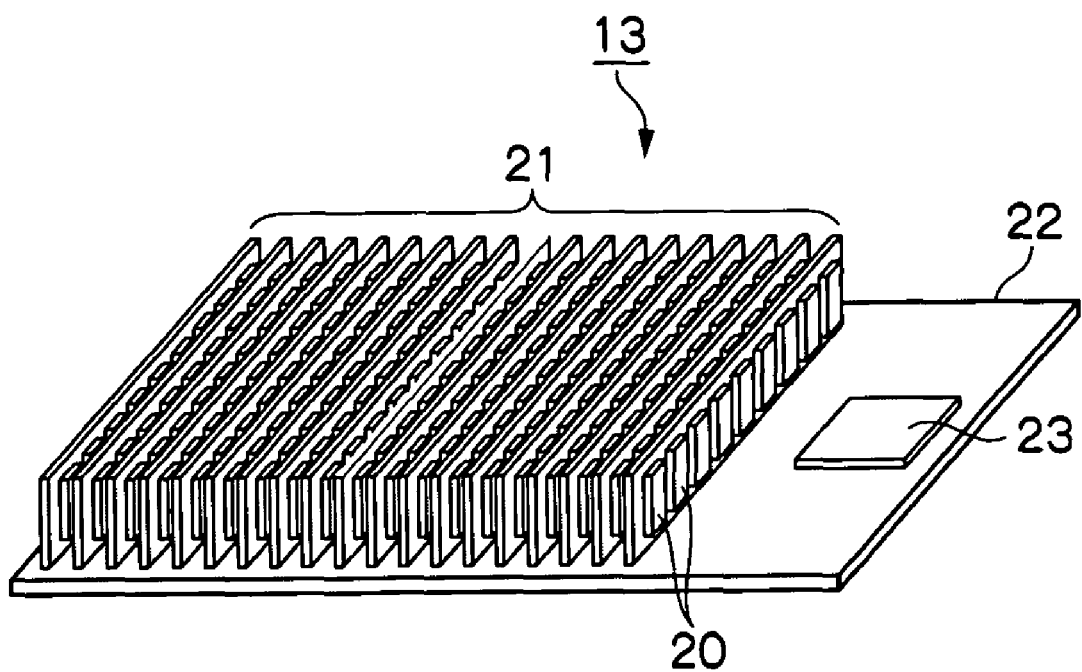
FIG. 2 is a perspective view showing the configuration of a flash memory according to the first embodiment.

The flash memory package 13, as shown in FIG. 2, is configured by a plurality of flash memory modules (hereinafter referred to as "flash memories") 21 respectively mounting a plurality of flash memory chips 20 being mounted replaceably on a wiring substrate 22 of a prescribed size. A flash memory control LSI (Large Scale Integration circuit) 23 is mounted on one end of the wiring substrate 22, and the flash memory controller 33 described later formed in the flash memory control LSI 23 is able to control the I/O of data to and from the respective flash memory chips 20 in the flash memory package 13.

A connector (not shown) is provided to the rear end side of the flash memory package 13, and the flash memory package 13 can be mounted on a backboard (not shown) in a physically and electrically connected state by connecting the foregoing connector to a connector (not shown) of the backboard mounted on the rack frame 10.

The logical substrate 14 is configured from a channel controller 31, a disk controller 32, a cache memory 34, a cache controller 35, a connection unit 36, a processor controller 37 and the like described later with reference to FIG. 3. The logical substrates 14 are removably connected to a backboard (not shown) mounted on the rack frame 10, and configured communicably with the other logical substrates 14 loaded in the rack frame 10 via the backboard.

The power source battery unit 15 is configured from a power source unit 15A and a battery unit 15B. Among the above, the power source unit 15A converts commercial AC power supplied externally into DC power, and supplies this to the respective components in the storage controller 2. The battery unit 15B is used as a backup power source for supplying power to the respective components in the storage controller 2 during a blackout or when there is any abnormality in the power source unit 15A.

The rack frame 10 is configured so that it can be internally compartmentalized into a plurality of tiers with partition boards In this embodiment, the inside of the rack frame 10 is compartmentalized into a total of 9 tiers, and the cooling fan units 11 are housed in the uppermost tier to the $6^{th}$ tier, the hard disk units 12 are housed in the $2^{nd}$ tier and the $3^{rd}$ tier from the top, the flash memory packages 13 are housed in the $4^{th}$ tier and the $5^{th}$ tier from the top, the logical substrates 14 are housed in the $7^{th}$ tier and the $8^{th}$ tier from the top, and the power source battery unit 15 is housed in the lowermost tier, respectively.

Meanwhile, the storage apparatus 3 is configured by housing a cooling fan unit 11, a plurality of flash memory packages 13 and a power source battery unit 15 in a rack frame 16. The storage apparatus 3 is connected to the storage controller 2 via a communication cable (not shown) configured from a fibre channel or the like, and the logical substrates 14 in the storage controller 2 are thereby able to communicate with the respective flash memory packages 13 loaded in the storage apparatus 3 via a communication cable.

The rack frame 16 is configured roughly the same as the rack frame 11 of the storage controller 2. In this embodiment, the rack frame 16 is internally compartmentalized into a total of 8 tiers, and the cooling fan unit 11 is housed in the uppermost tier, and the power source battery unit 15 is housed in the lowermost tier, respectively. The flash memory packages 13 are respectively housed in each tier other than the foregoing uppermost tier and lowermost tier.

(1-2) Internal Configuration of Storage System

Figure 3:
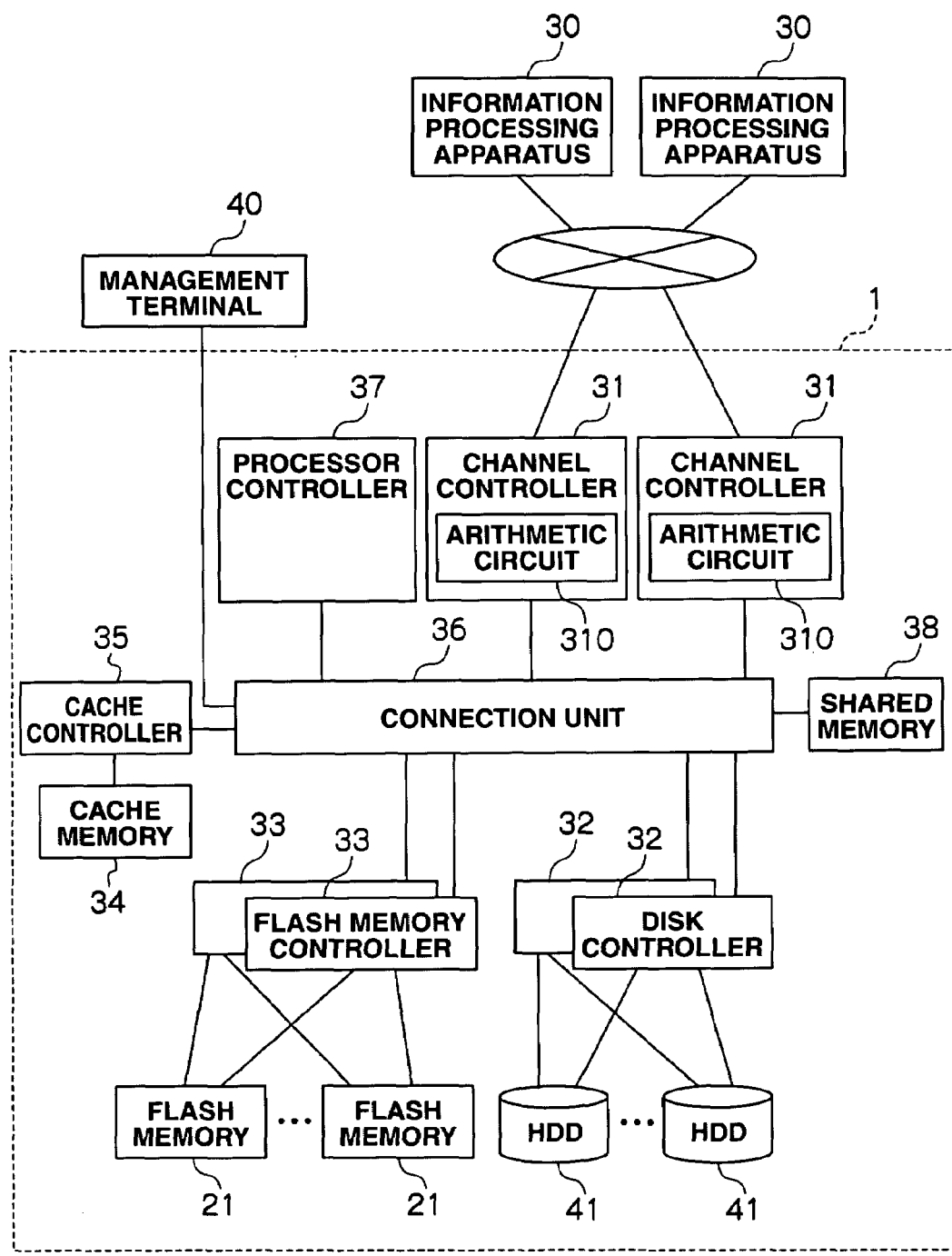
FIG. 3 is a block diagram showing the storage system according to the first embodiment.

FIG. 3 shows the internal configuration of the storage system 1 according to the present embodiment. As shown in FIG. 3, the storage system 1 comprises a channel controller 31, a hard disk drive 41, a disk controller 32, a flash memory 21, a flash memory controller 33, a cache memory 34, a cache controller 35, a connection unit 36, a processor controller 37 and a shared memory 38.

The channel controller 31 functions as an interface to the information processing apparatus 30, and sends and receives various command and data to and from the information processing apparatus 30. The channel controller 31 includes an arithmetic circuit 310 for creating parity data based on data from the information processing apparatus 30. Configuration of the arithmetic circuit 310 will be described later.

The hard disk drive 41 is a second memory device, and is loaded in the storage system 1 in a state of being housed in the hard disk drive unit 12 as described above, and operated by the processor controller 37 in RAID format. As the hard disk drive 41, for instance, expensive hard disk drives such as SCSI (Small Computer System Interface) disks or inexpensive hard disks such as SATA (Serial AT Attachment) disks may be used.

The disk controller 32 is a second memory device controller, and is connected to each of hard disk drives loaded respectively in the storage controller 2 and the storage apparatus 3 via a fibre channel cable. The disk controller 32 functions as an interface to the hard disk drives 41, and controls the I/O of data to and from the hard disk drive 41.

The flash memories 21 are first memory devices and configure a rewritable, nonvolatile semiconductor memory group, and are loaded in the storage system 1 as a flash memory package 13 as described above.

A plurality of parity groups PG are formed from a plurality of flash memories 21 and one or more hard disk drives 41, and one logical volume (hereinafter referred to as a "logical volume") LDEV is set in a physical storage area provided by the parity group PG. A parity group PG is a group configured from a data group sharing the same parity data and the parity data calculated from such data group.

Figure 4:
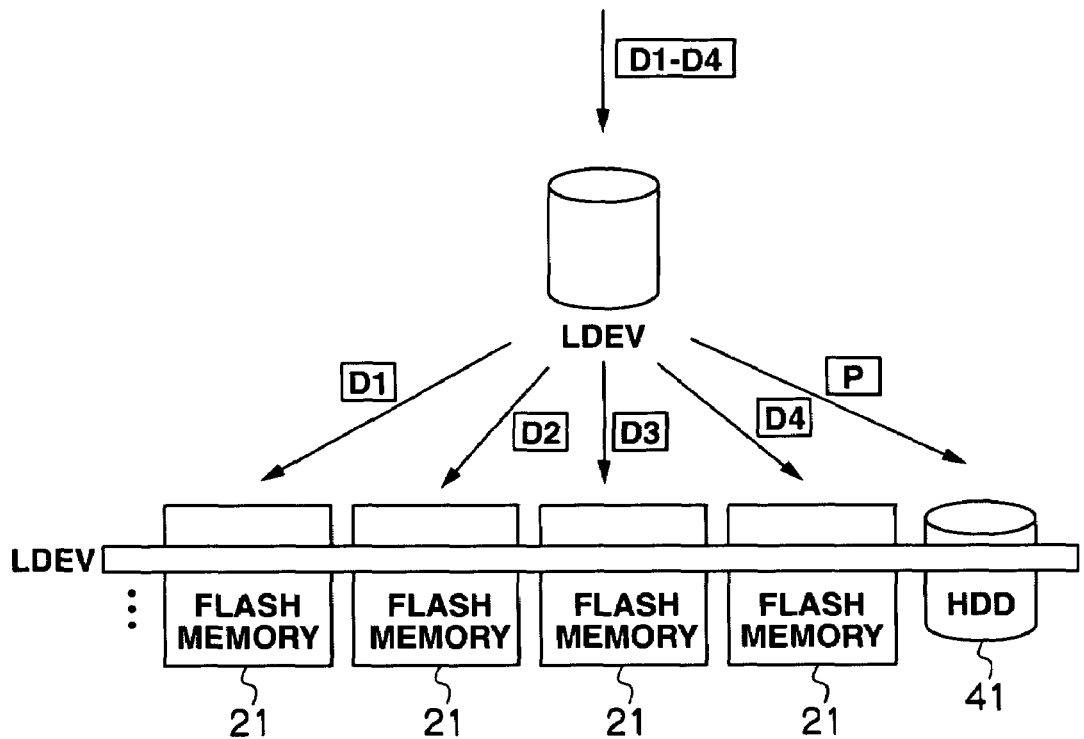
FIG. 4 is a conceptual diagram explaining a logical volume according to the first embodiment.

FIG. 4 shows an example of forming a logical volume. In this embodiment, the data D1-D4 and the parity data P described later operated and calculated by the arithmetic circuit 310 are stored in the logical volume LDEV formed on a physical storage area provided by a plurality of flash memories 21 and at least one hard disk drive 41. The parity data P is data for protecting the data D1-D4 from the information processing apparatus as a host system, and is used for recovering lost data when any one of the data D1-D4 is lost.

The data D1-D4 from the information processing apparatus 30 are stored in the plurality of flash memories 21 associated with the logical volume LDEV, and the parity data P is stored in the hard disk drive 41 associated with the logical volume LDEV.

The data D1-D4 and the parity data P from the information processing apparatus 30 are read from and written into the logical volume LDEV in block units of a prescribed size, which are the data management units in the flash memory 21 and the hard disk drive 41.

Each logical volume LDEV is allocated with a unique identifying number (LUN: Logical Unit Number). The I/O of data is performed by designating the combination of this LUN and a unique block number that is allocated to the respective blocks as the address, and designating this address.

The flash memory controller 33 is a first memory device controller, and is formed in the flash memory control LSI 23 mounted respectively on each of the flash memory packages 13 as described above. The flash memory controller 33 functions as an interface to the flash memories 21, and controls the I/O of data to and from the respective flash memories 21 in the same flash memory package 13.

The cache memory 34 is configured from a volatile memory such as an SDRAM (Synchronous Dynamic Random Access Memory). The cache controller 35 controls the I/O of data to and from the cache memory 34.

The connection unit 36 is configured from mutually connectable switches or buses. The transfer of data and commands among the channel controller 31, the disk controller 32, the flash memory controller 33, the cache controller 35, the processor controller 37 and the shared memory 38 are conducted via the connection unit 36.

The shared memory 38 is a storage memory to be shared by the channel controller 31, the disk controller 32 and the flash memory controller 33. The shared memory 38 is primarily used for storing the system configuration information and various control programs read from the logical volume LDEV when the storage system 1 is turned on, and commands from the information processing apparatus 30.

Figure 5:
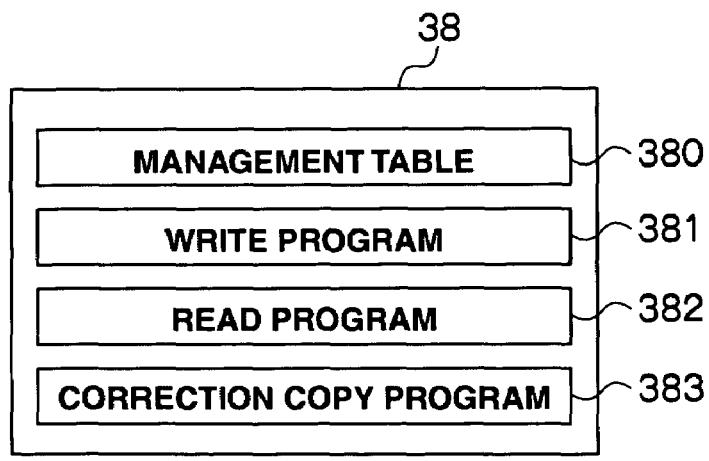
FIG. 5 is a chart showing the contents of a shared memory according to the first embodiment.

The shared memory 38, as shown in FIG. 5, stores a management table 380, a write program 381 for writing data from the information processing apparatus 30 into the logical volume LDEV, a read program 382 for reading data requested by the information processing apparatus 30 from the logical volume LDEV, and a correction copy program 383 for recovering the lost data when a failure occurs.

The management terminal 40 is a computer system comprising hardware resources such as a CPU (not shown), a memory (not shown) and a management screen SC1 described later. The administrator sends commands for managing the storage system 1 to the storage system 1 by performing input operations with the management terminal 40. As commands for managing the storage system 1 there are, for instance, a command for increasing or decreasing of hard disk drives 41, a command for changing the RAID configuration, a command for confirming the operational status or identifying the failed site of the storage system 1, and so on.

With the storage system 1 of this embodiment, in order to achieve redundancy, two disk controllers 32 and two flash memory controllers 33 are provided, respectively.

In addition, according to this embodiment, SAS is used as the interface of the flash memory controller 33 and the flash memory 21, and as the interface of the hard disk controller 32 and the hard disk drive 41.

(1-3) Configuration Management Table

The management table 380 stored in the shared memory 38 is now explained.

As shown in FIG. 6, the management table 380 is a table for performing management so that data from the information processing apparatus 30 is stored in the flash memory 21 and the parity data P is stored in the hard disk drive 41. The management table 380 is output to the screen of the management terminal 40.

The management table 380 is configured from a "data name" column 3810, a "memory address" column 3811 showing the address where that data is temporarily stored in the cache memory 34, a "data length" column 3812 showing the length of that data, a "parity group number" column 3813, a "logical volume number" column 3814, a "flash memory number/hard disk drive number" column 3815, and an "address" column 3816.

The "parity group number" column 3813 registers the number of the parity group PG to which that data belongs.

The "logical volume number" column 3814 registers the number of the logical volume LDEV storing that data.

The "flash memory number/hard disk drive number" column 3815 registers the flash memory number or the hard disk drive number associated with the logical volume LDEV storing the data and which actually stores that data.

The "address" column 3816 registers the address in the flash memory 21 or in the hard disk drive 41 storing that data.

(1-4) Write Processing

The write processing of how to store data in the flash memory 21 and how to store the parity data P in the hard disk drive 41 is now explained. The write processing is executed by the processor controller 37 based on the write program 381.

Figure 7:
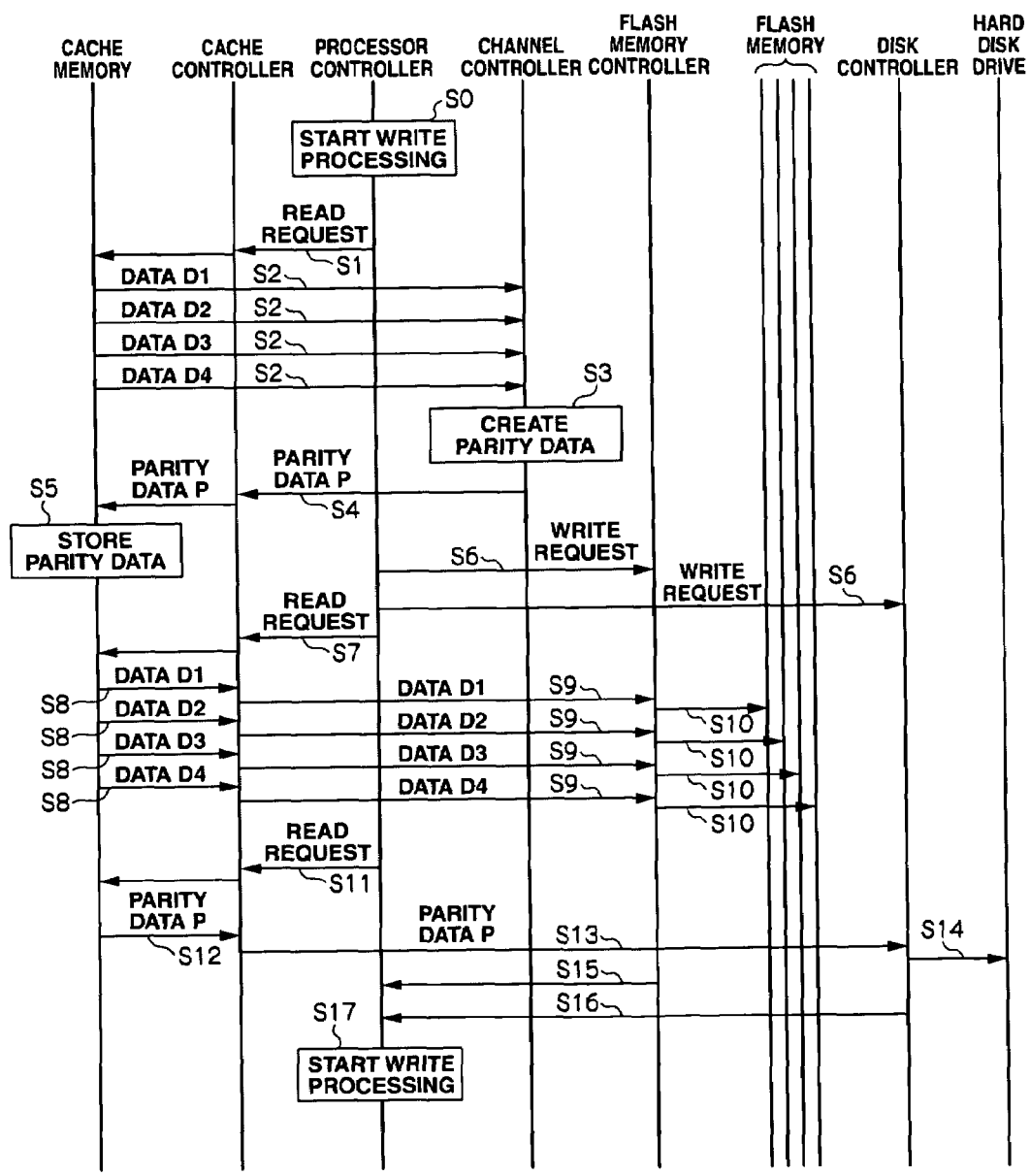
FIG. 7 is a flowchart showing the write processing according to the first embodiment.

FIG. 7 is a flowchart showing the write processing in the storage system 1.

Foremost, the processor controller 37 stores data (hereinafter referred to as "host data") D1-D4 from the information processing apparatus 30 in the cache memory, thereafter notifies a completion report to the information processing apparatus 30, and then boots the write program 381 to start the write processing (S0).

Subsequently, the processor controller 37 issues a read request to the cache controller 35 for reading the host data (S1). Consequently, the cache controller 35 reads the host data from the cache memory, and the cache controller 35 sends the host data D1-D4 to the processor controller 37 (S2).

The processor controller 37 that received the host data D1-D4 operates the parity data P of the host data D1-D4 with the arithmetic circuit 310, and thereby creates such parity data P (S3). Operation with the arithmetic circuit 310 will be explained later. The processor controller 37 thereafter sends the parity data P operated with the channel controller 31 to the cache controller 35 (S4). Then, the cache controller 35 stores the operated parity data P in the cache memory 34 (S5). Simultaneously, the processor controller 37 registers the operated parity data P in the management table 380.

The processor controller 37 issues a write request to the flash memory controller 33 for writing the host data D1-D4 in the flash memory 21, and issues a write request to the disk controller 32 for writing the parity data in the hard disk drive 41 (S6).

The flash memory controller 33 refers to the management table 380, and issues a read request to the cache controller 35 for reading the host data D1-D4 (S7). Then, the cache controller 35 reads the host data D1-D4 from the cache memory 34 (S8), and sends the read host data D1-D4 to the flash memory controller 35 (S9). The flash memory controller 35 thereafter stores the read host data D1-D4 in a plurality of flash memories 21 (S10), and registers information concerning the host data in a corresponding location of the management table.

The processor controller 37 refers to the management table 380 and issues a read request to the cache controller 35 for reading the parity data P (S11). Then, the cache controller 35 reads the parity data P from the cache memory 34 (S12), and sends the read parity data P to the disk controller 35 (S13). The disk controller 35 stores the parity data P in the hard disk drive 41 (S14), and registers information concerning the parity data P in a corresponding location of the management table.

The processor controller 37 receives a completion report from the flash memory controller 33 (S15) and, upon receiving a completion report from the disk controller 32 (S16), ends this write processing (S17).

Figure 8:
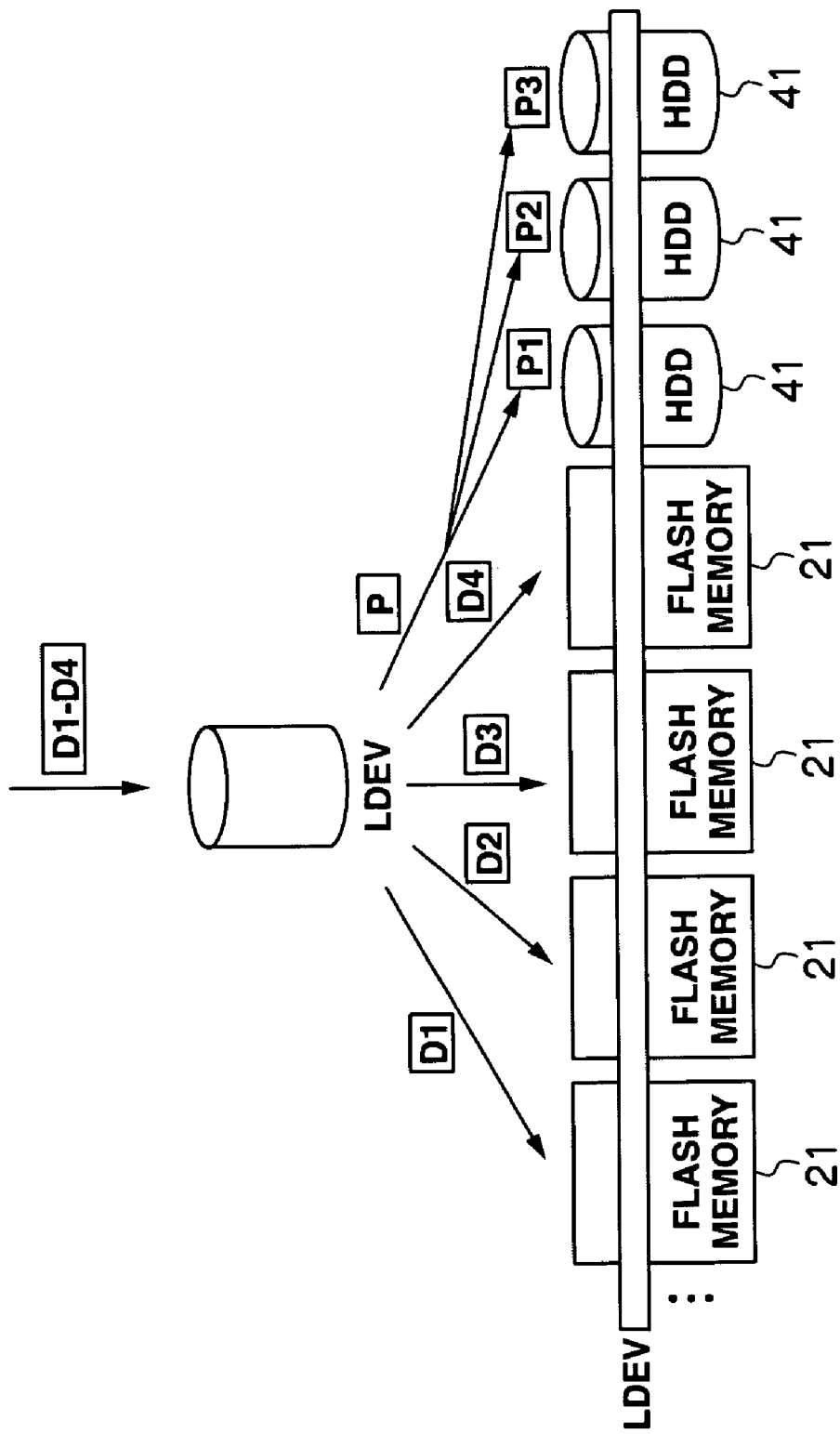
FIG. 8 is a conceptual diagram showing a modified example of the storage system according to the first embodiment.
Figure 9:
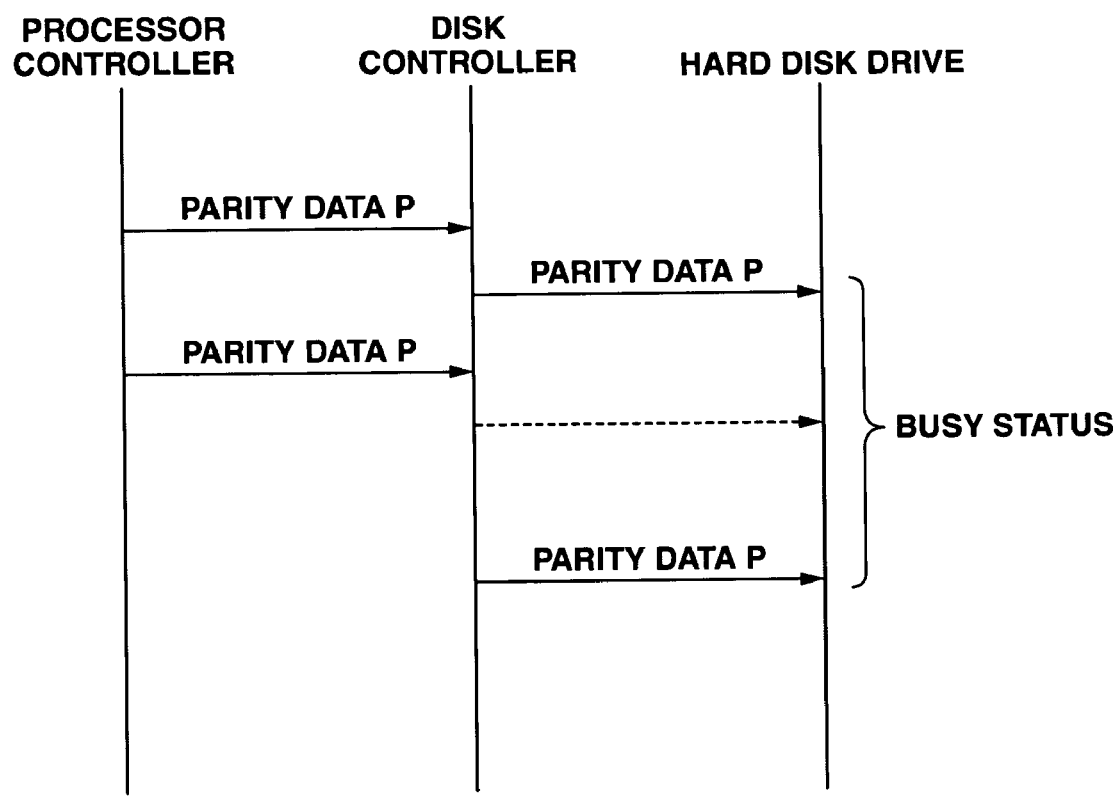
FIG. 9 is an explanatory diagram showing the write processing of parity data according to the first embodiment.
Figure 10:
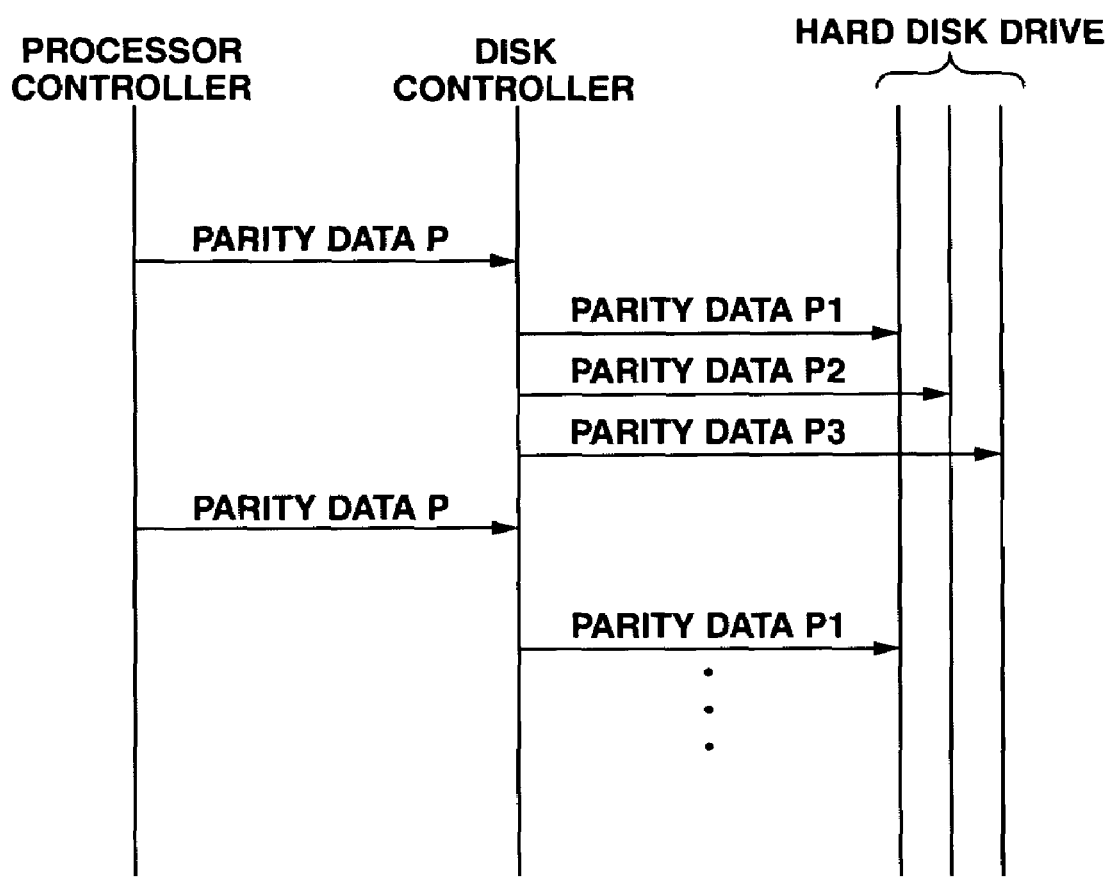
FIG. 10 is an explanatory diagram showing the write processing of parity data in a modified example of the first embodiment.

Here, as shown in FIG. 8, instead of storing the parity data P in a storage area of a single hard disk drive 41, the configuration may also be such that the parity data P1-P3 are stored in the storage area of a plurality of hard disk drives 41. Here, as shown in FIG. 9, if parity data is written sequentially even when one of the hard disk drives is of a busy status, the write processing of the initial parity data will end and there will be a delay in the time until the write processing of the subsequent parity data is started. Nevertheless, as shown in FIG. 8 and FIG. 10, if a plurality of hard disk drives 41 are configured in RAID format, even if one of the hard disk drives 41 is of a busy status the other hard disk drives 41 will not be affected, and the writing of the parity data P1-P3 can be performed smoothly. In addition, since the parity data P is distributed into parity data P1-P3 and then stored in the plurality of hard disk drives 41, the write time of the parity data P1-P3 is shortened, and the write performance can be improved thereby.

Figure 11:
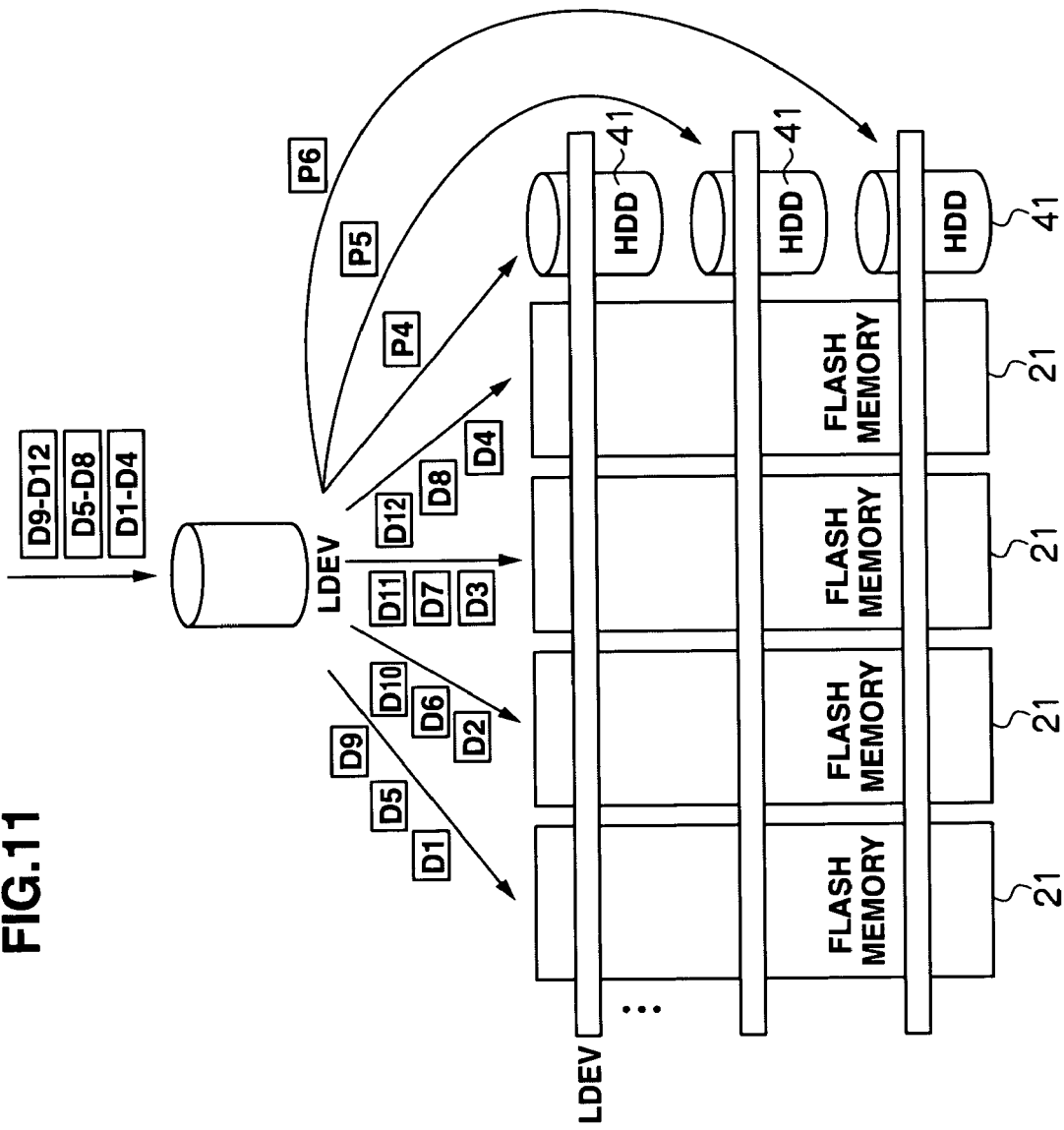
FIG. 11 is a conceptual diagram showing another modified example of the storage system according to the first embodiment.

As shown in FIG. 11, instead of storing the parity data P4-P6 in a single hard disk drive 41 in a concentrated manner, the configuration may also be such that a plurality of hard disk drives 41 are prepared and parity data P4-P6 are stored in a different hard disk drive 41 each time such parity data is created. In this configuration also, even if one of the hard disk drives 41 is of a busy status the other hard disk drives 41 will not be affected, and the writing of the parity data P4-P6 can be performed smoothly.

When write processing is performed as described above, the storage system of this embodiment is able to sort the storage of data by storing the host data in the flash memory, and storing the parity data in the hard disk drive. Thereby, since data can be read from a flash memory having a fast read response and parity data that is updated each time such data is updated can be stored in a hard disk with an unlimited write count, the system performance will improve. In particular, since RAID 3 stores the parity data fixedly in a single hard disk drive, this embodiment is most effective in a storage system configured in RAID 3 format.

(1-5) Arithmetic Processing

Figure 12:
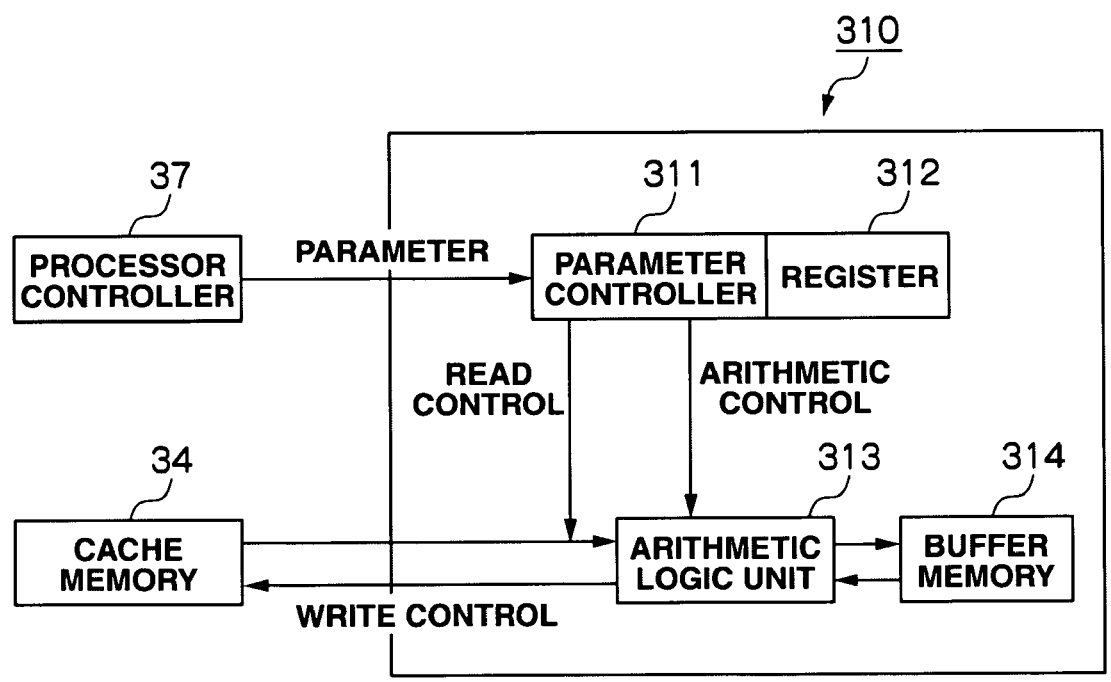
FIG. 12 is a block diagram showing an arithmetic circuit according to the first embodiment.

The arithmetic processing on how the arithmetic circuit 310 specifically operates and calculates the parity data P is now explained. FIG. 12 is a configuration diagram of the arithmetic circuit 310.

The arithmetic circuit 310 is a circuit retained by the channel controller 31, and is primarily configured from a parameter controller 311 for commanding the respective components in the arithmetic circuit 310 according to parameters from the processor controller 37, a register 312 to be used for retaining the operation or execution status, an arithmetic logic unit 313 for actually executing the operation, and a buffer memory 314 for temporarily storing the operated value.

The contents of the parameters are shown in FIG. 13. For example, parameter "CMD" defines the contents of the operation method. As specific "CMD" contents, considered may be a command for creating parity data, a command for performing partial write, a command for correcting the lost data, and so on.

The term "partial write" refers to the operation of new parity data pursuant to the update of certain data. Further, the correction of lost data refers to the operation of the lost data from other data and parity data when a failure occurs due to the loss of certain data or the like.

Moreover, as contents of the chart, parameter "CCMADR" commands the read address of the data to be operated, and parameter "NCMADR" commands the write address of the data after operation. Parameter "LENGTH" commands the data length to be read, and parameter "STSADR" commands the end of operation. Parameter "PRM" commands the function coefficient to be used in operating the parity data, and parameter "LRC" commands the assignment of a guarantee code for determining whether the parameter "CMD" is correct. Without limitation to the foregoing parameters, the parameters that are necessary for the operation are set as needed.

Figure 14:
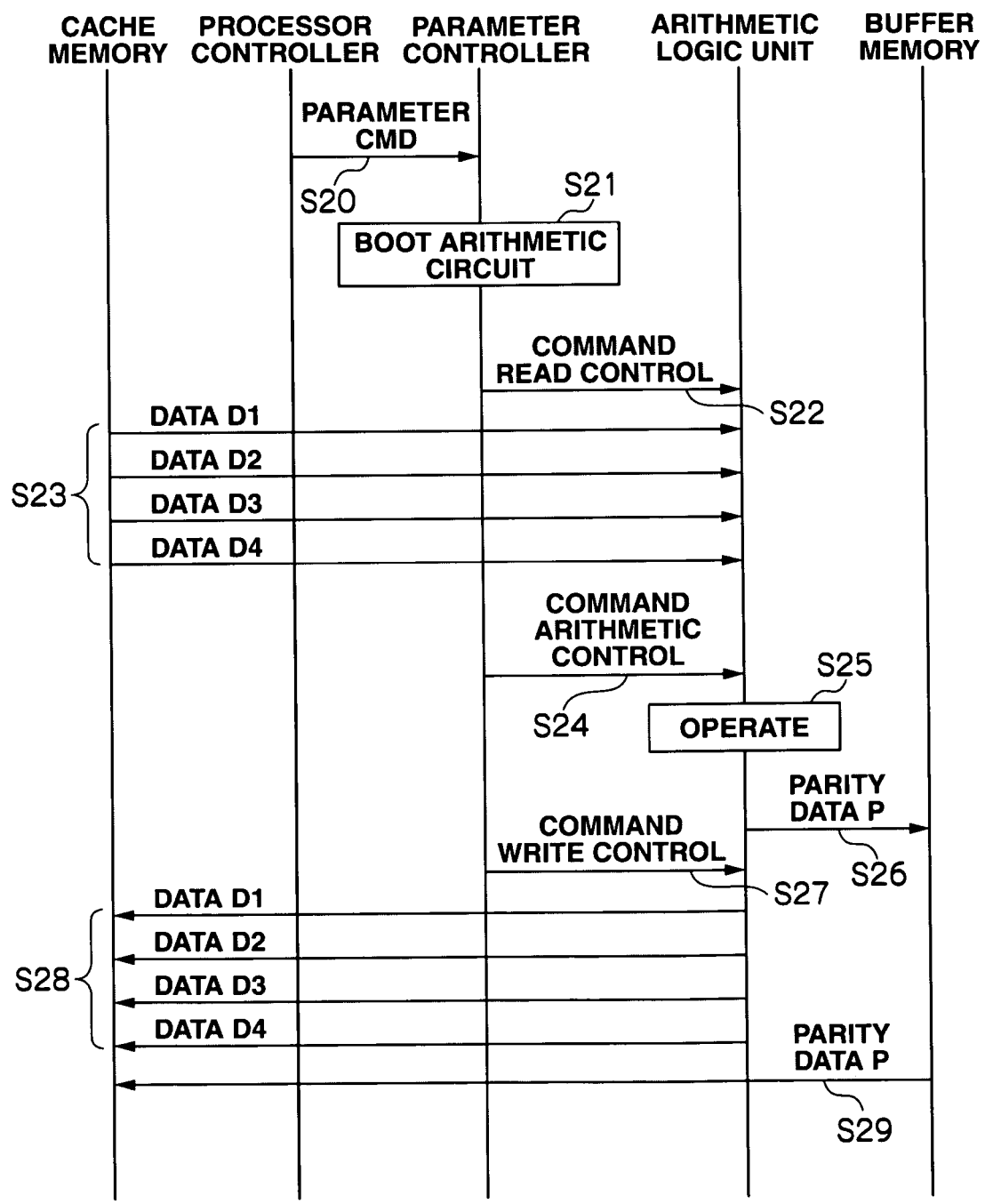
FIG. 14 is a flowchart for operating parity data according to the first embodiment.

The specific method of creating parity data is now explained. FIG. 14 is a flowchart for operating parity data.

When the parameter "CMD" is written from the processor controller 37 (S20), the arithmetic circuit 310 is booted (S21). The parameter controller 311 of the arithmetic circuit 310 issues the parameter "CCMADR," and commands the arithmetic logic unit 313 to read the host data D1-D4 in the cache memory 34 (S22). Then, the arithmetic logic unit 313 reads the host data in the cache memory 34 from the cache memory 34 (S23).

Subsequently, the parameter controller 311 issues parameters such as the parameter "PRM" required for the operation, and commands the arithmetic logic unit 313 to perform arithmetic control (S24). Then, the arithmetic logic unit 313 operates the parity data P of the host data D1-D4 (S25). The parameter controller 311 temporarily stores the operated parity data P in the buffer memory 314 (S26).

The parameter controller 311 issues the parameter "NCMADR" and commands the arithmetic logic unit 313 to write back the read host data D1-D4 and the operated parity data P in the cache memory 34 (S27). Then, the arithmetic logic unit 313 writes back the read host data D1-D4 and the operated parity data P in the cache memory 34 (S28, S29), and ends the arithmetic processing.

Figure 15:
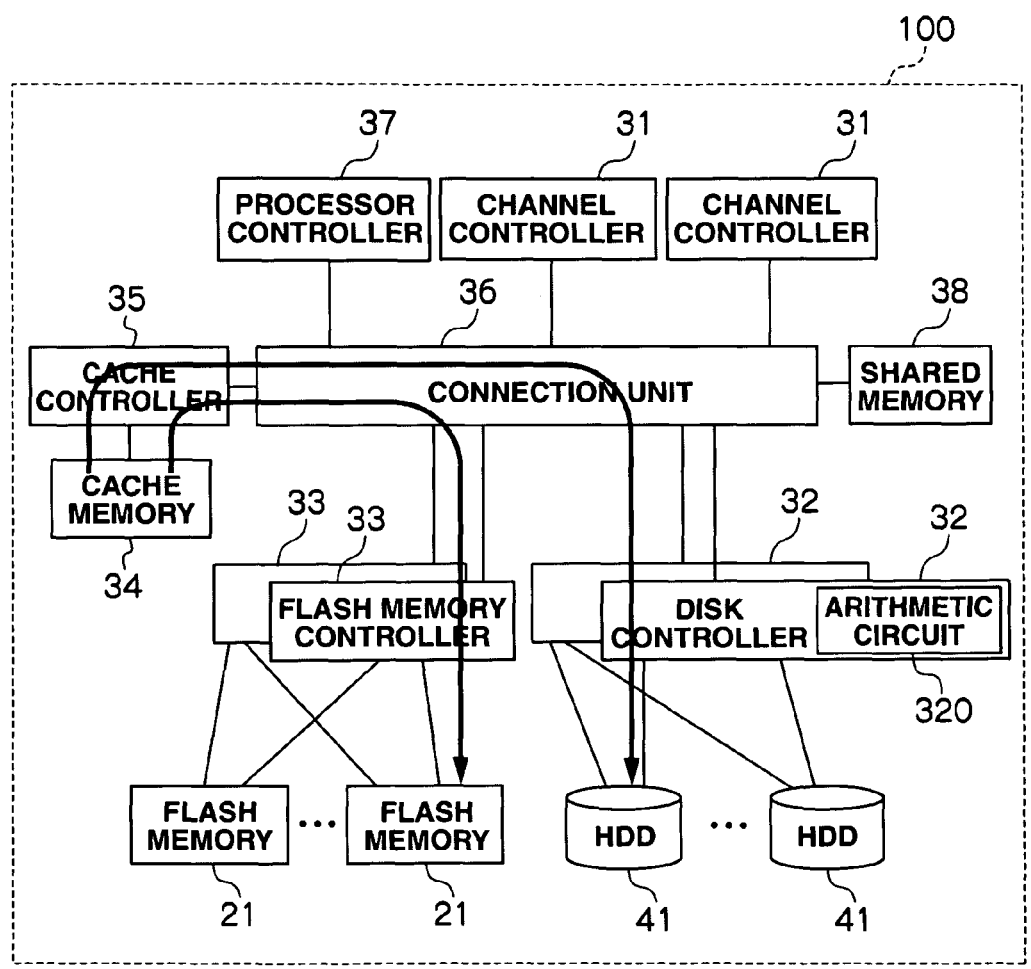
FIG. 15 is a block diagram showing a modified example of the arithmetic circuit according to the first embodiment.

Here, as with the storage system 100 shown in FIG. 15, the arithmetic circuit 320 may retain the disk controller 32. In this case, although the reading of data from the cache memory 34 must be performed twice in the disk controller 32 and the flash memory controller 33, the transaction between the information processing apparatus 30 and the channel controller 31 will not be influenced.

Figure 16:
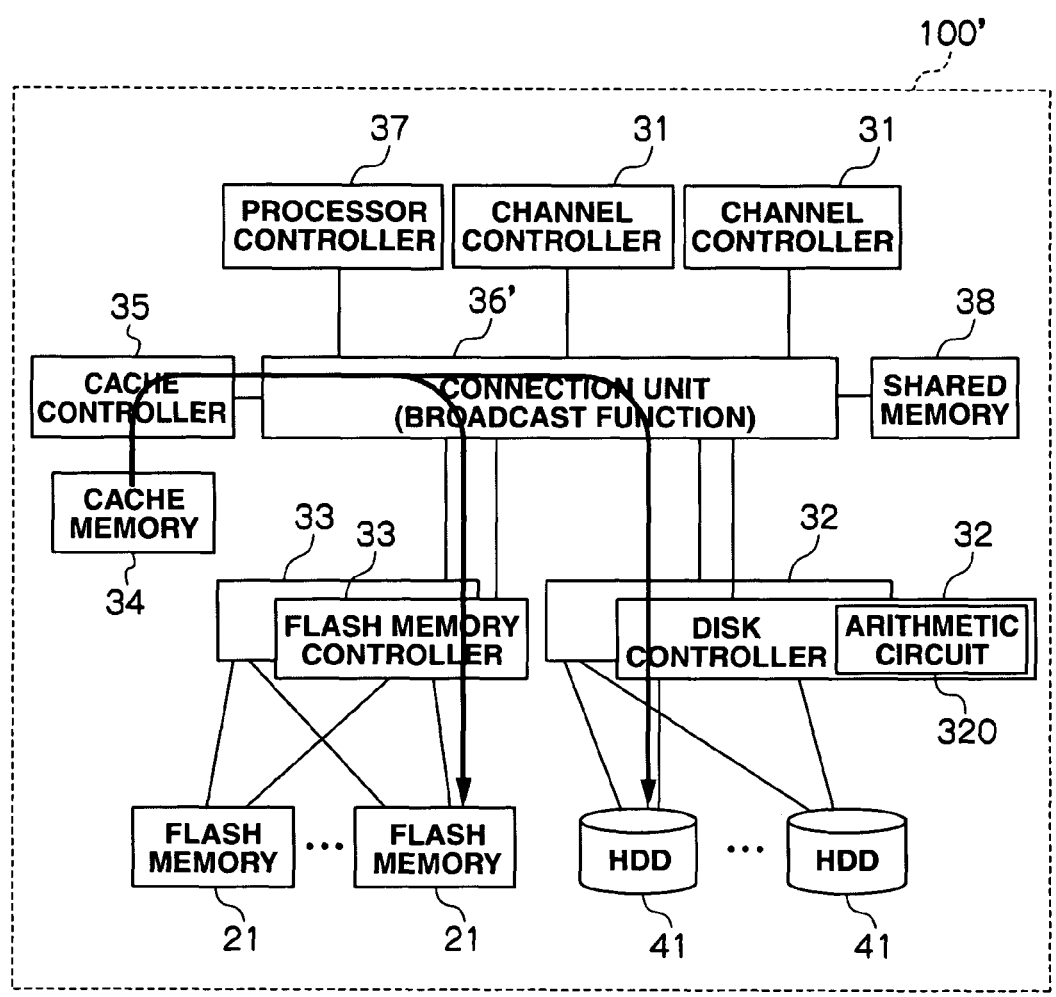
FIG. 16 is a block diagram showing a modified example of the connection unit according to the first embodiment.

In addition, as with the storage system 100' shown in FIG. 16, the arithmetic circuit 320 may be retained in the disk controller 32 and the configuration of the connection unit 36' with a broadcast function may also be adopted. In this case, since the connection unit 36' is able to send the data read from the cache memory 34 to the disk controller 32 and the flash memory controller 33, the reading of data from the cache memory 34 does not have to be performed a plurality of times. Thus, not only will the transaction between the information processing apparatus 30 and the channel controller 31 be unaffected, the transaction between the cache memory 34 and the connection unit 36' will also be unaffected.

(1-6) Read Processing

The read processing of how data is read from the flash memory 21 is now explained. The read processing is executed by the processor controller 37 based on the read program 382.

Figure 17:
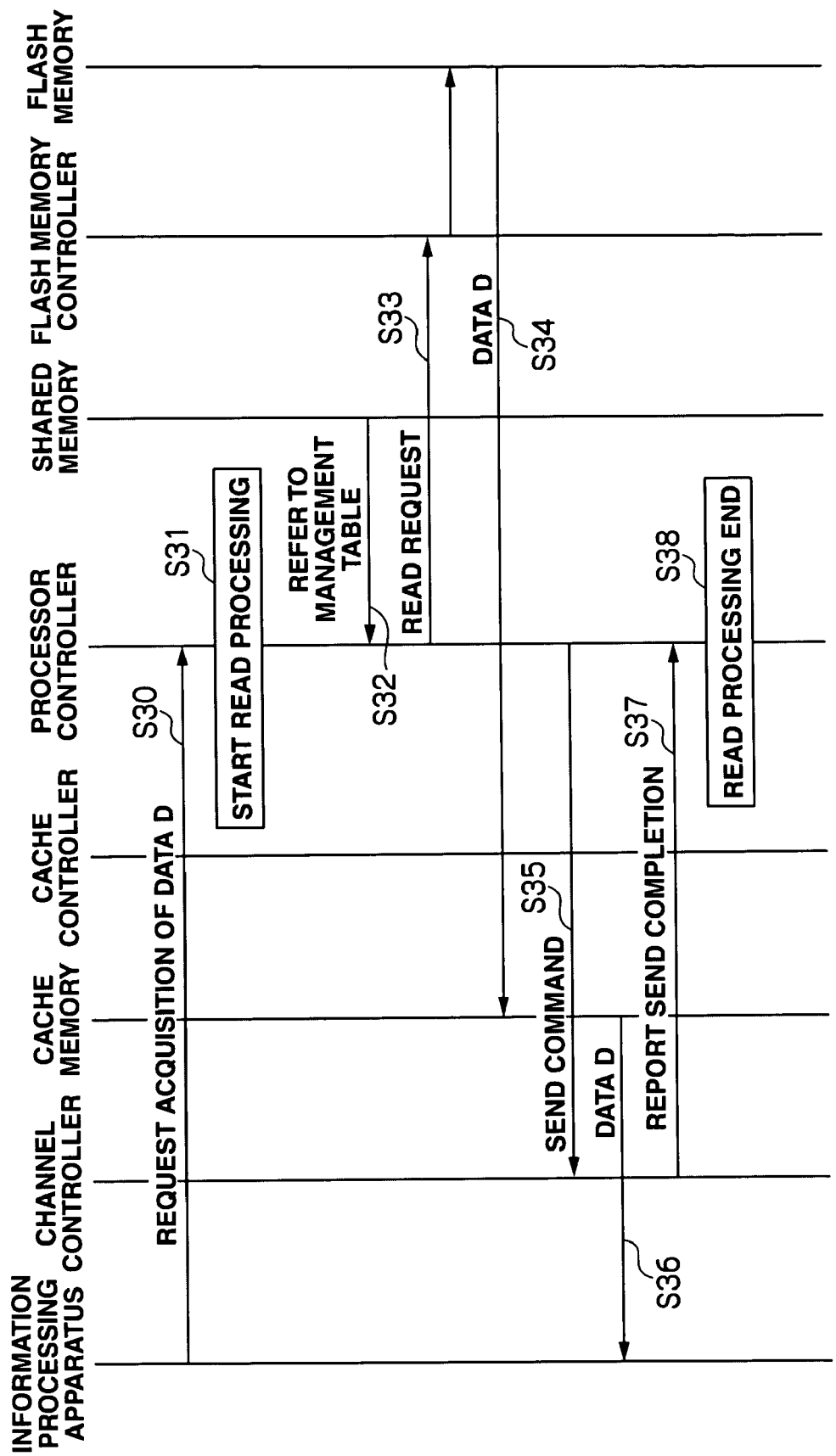
FIG. 17 is a flowchart showing the read processing according to the first embodiment.

FIG. 17 is a flowchart showing the read processing in the storage system 1.

Foremost, when the processor controller 37 receives an acquisition request of certain data D from the information processing apparatus 30 (S30), it starts the read processing (S31).

Subsequently, the processor controller 37 refers to the management table and confirms the flash memory from which data is to be read and the read address thereof (S32). After confirmation, the processor controller 37 sends a command indicating the flash memory from which data is to be read and the read address thereof to the flash memory controller 33 (S33).

The flash memory controller 33 that received the command from the processor controller 37 reads the data requested by the information processing apparatus 30 from the designated address of the flash memory 21 (S34). The processor controller 37 thereafter temporarily stores the read data in the cache memory.

The processor controller 37 commands the channel controller 31 to send the data stored in the cache memory 34 to the information processing apparatus 30 (S35).

The channel controller 31 sends the data stored in the cache memory 34 to the information processing apparatus 30 (S36), and thereafter sends a send completion report to the processor controller 37 (S37). When the processor controller 37 receives the send completion report, it ends the read processing (S38).

In the case of read processing, as described above, it is not necessary to read the parity data P stored in the hard disk drive 41 and, since it will suffice to read the data from the flash memory 21 having a read response, it is no longer necessary to use the hard disk drive 41 having a slower read response than the flash memory 21.

(1-7) Correction Copy Processing

Figure 18:
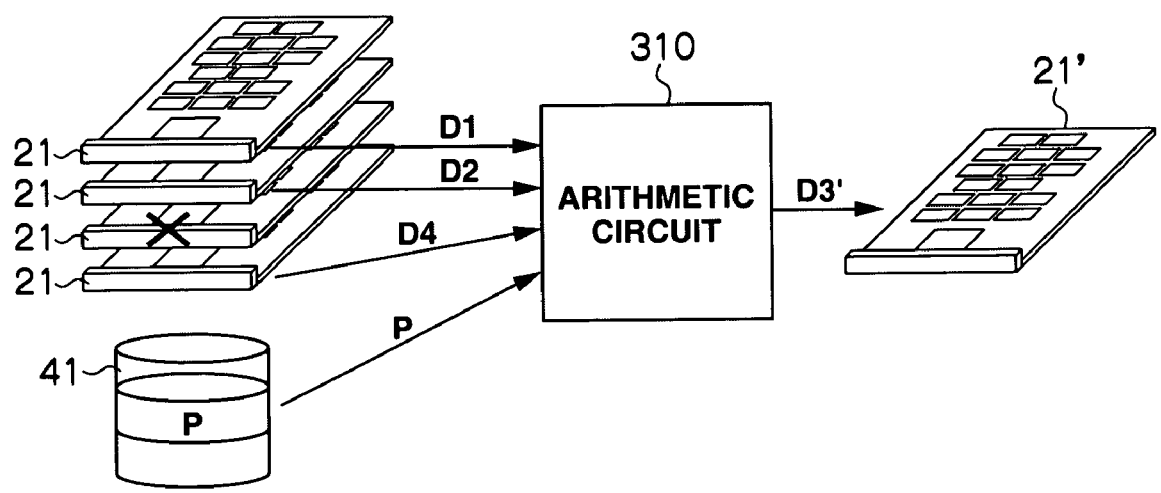
FIG. 18 is an explanatory diagram explaining the correction copy according to the first embodiment.

The correction copy processing is now explained. Correction copy is, as shown with the conceptual diagram of FIG. 18, the processing of operating the lost data from other data and parity data when a failure occurs due to the loss of certain data, and storing (replicating) the operated data in a spare flash memory.

The correction copy processing is executed by the processor controller 37 based on the correction copy program 383.

Specifically, when the administrator confirms the flash memory 21 from which data was lost with the management screen of the management terminal 40, the administrator issues a correction copy command to the storage system 1. The processor controller 37 that received the command starts the correction copy processing.

The management screen is now explained.

FIG. 19 shows a screen SC1 for notifying the administrator of the flash memory 21 or the hard disk drive 41 subject to a failure due to the loss of data or the like.

When a failure occurs, the flash memory controller 33 or the disk controller 32 detects the failure and notifies the processor controller 37. The processor controller 37 that received the notification sends information of the failed flash memory 21 or information of the failed hard disk drive 41 to the management terminal 40. The administrator managing the management terminal 40 is able to confirm information concerning the failure based on the management screen SC1.

The screen left column SC10 displays the number of all parity groups GP configured in the storage system 1. When a failure occurs, the administrator is visually notified of a failure by blinking the failed parity group number or using other methods.

The screen right column SC20 displays information of the flash memory 21 or information of the hard disk drive 41 belonging to the parity group PG2 selected in the screen left column S10. The screen right column SC20, for example, displays information concerning the logical configuration subject to a failure in the upper row, and information concerning the physical configuration subject to a failure in the lower row.

Information concerning the logical configuration includes a "logical volume number" column 200 subject to a failure, a "status" column 201 showing whether correction was performed; that is, whether the logical volume LDEV has been recovered, and an "etc" column 203 showing management information and the like concerning the logical volume LDEV.

Information concerning the physical configuration includes a "flash memory number or hard disk drive number" column 203, a "location" column 204 showing which tier of which chassis the physical device number is located, and an "etc" column 205 showing whether correction was performed; that is, whether the physical device number has been recovered.

The foregoing configuration information is merely an example, and the present invention is not limited to such configuration information.

When a failure occurs, the administrator is visually notified of a failure by blinking the information of the failed flash memory 21 or the information of the failed hard disk drive 41 or using other methods.

Figure 20:
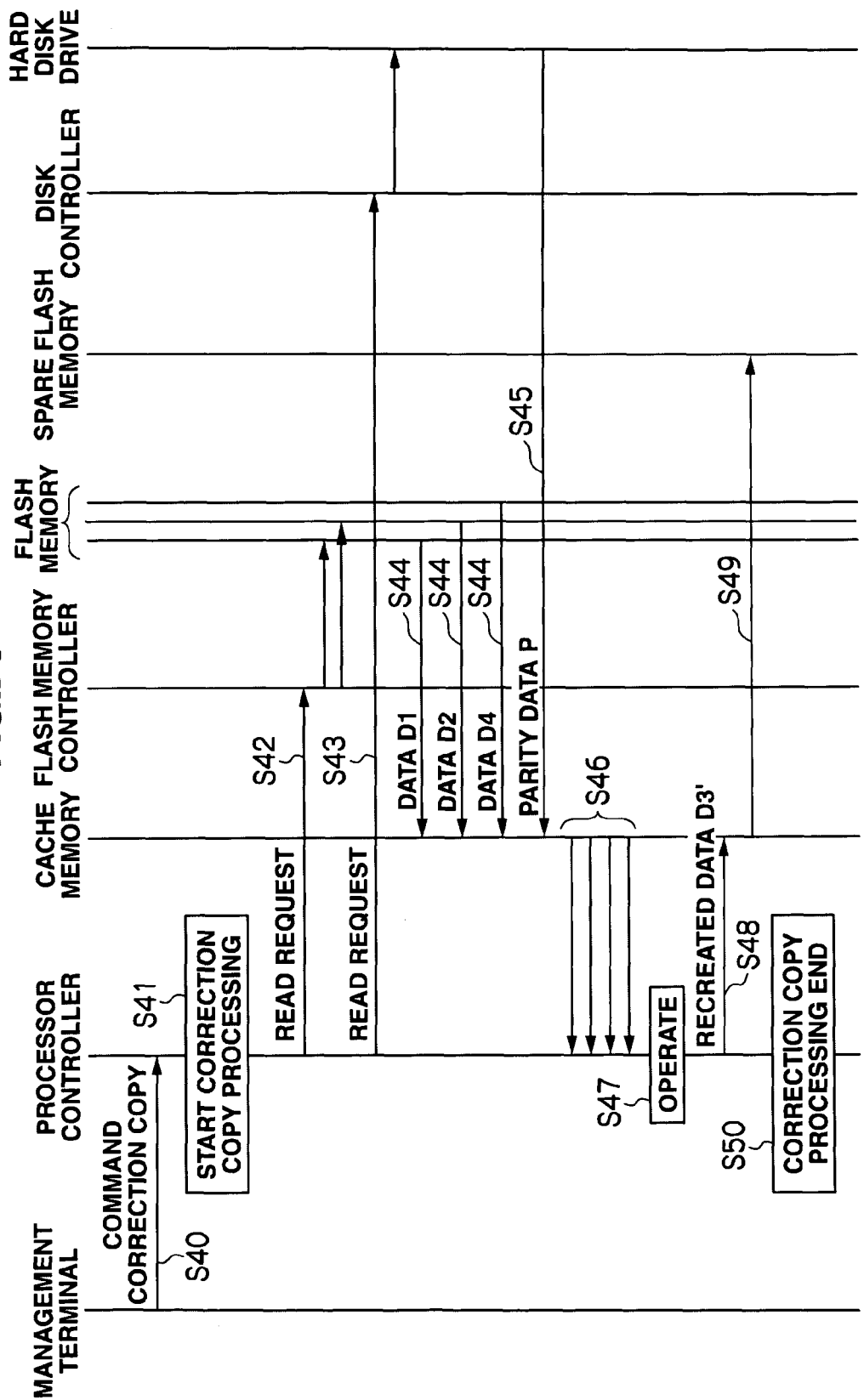
FIG. 20 is a flowchart showing the correction copy processing according to the first embodiment.

The specific correction copy processing is now explained. FIG. 20 is a flowchart showing the correction copy processing.

When the storage system 1 receives a correction copy command from the management terminal 40 (S40), the processor controller 37 starts the correction copy processing (S41). This embodiment explains a case where a failure occurred in one of the flash memories 21.

The processor controller 37 commands the flash memory controller 33 to read data D1, D2, D4 from the flash memories 21 other than the flash memory 21 from which data was lost (S42), and commands the disk controller 32 to read parity data P having the same parity group PG as the parity group PG to which the flash memory 21 from which data was lost belongs (S43).

The flash memory controller 33 reads the data D1, D2, D4 from the other flash memories 21 having the same parity group PG to which the flash memory 21 from which data was lost belongs into the cache memory 34 (S44). The disk controller 32 reads the parity data P from the hard disk drives 41 having the same parity group PG to which the flash memory 21 from which data was lost belongs into the cache memory 34 (S45).

The processor controller 37 thereafter writes the parameter "CMD" in the arithmetic circuit 310, and performs arithmetic processing of the lost data. The specific description of the parameter "CMD" is the correction of the lost data. The parameter controller 311 of the arithmetic circuit 310 reads the data D1, D2, D4 and the parity data. P in the cache memory 34 (S46), and performs operation of the lost data according to operation steps S22 to S28 (S47).

Incidentally, although the data D3 is read from the cache memory 34 at step S23 and step S28, in the correction copy processing, let it be assumed that the parity data P is read without reading the lost data D3. In addition, although the operated parity data P is stored in the buffer memory 314 at step S26, in the correction copy processing, let it be assumed that the operated data D3 is stored.

After the arithmetic circuit 310 recreates the data, it temporarily stores such data in the buffer memory 314. The arithmetic circuit 310 thereafter reads the recreated data from the buffer memory 314, sends the recreated data to the cache memory 34, and then ends the arithmetic processing.

The processor controller 37 reads the recreated data from the cache memory 34 (S48), and stores such data in the spare flash memory 21' (S49). The processor controller 37 thereafter registers information concerning the recreated data in the management table 380, and then ends the correction copy processing (S50).

(1-8) Effect of Present Embodiment

According to the present embodiment, life of the system can be extended by mounting a flash memory having a fast read response on the storage system and limiting the write count of the flash memory.

(2) Second Embodiment

A storage system 200 according to the second embodiment is now explained.

(2-1) System Configuration

Figure 21:
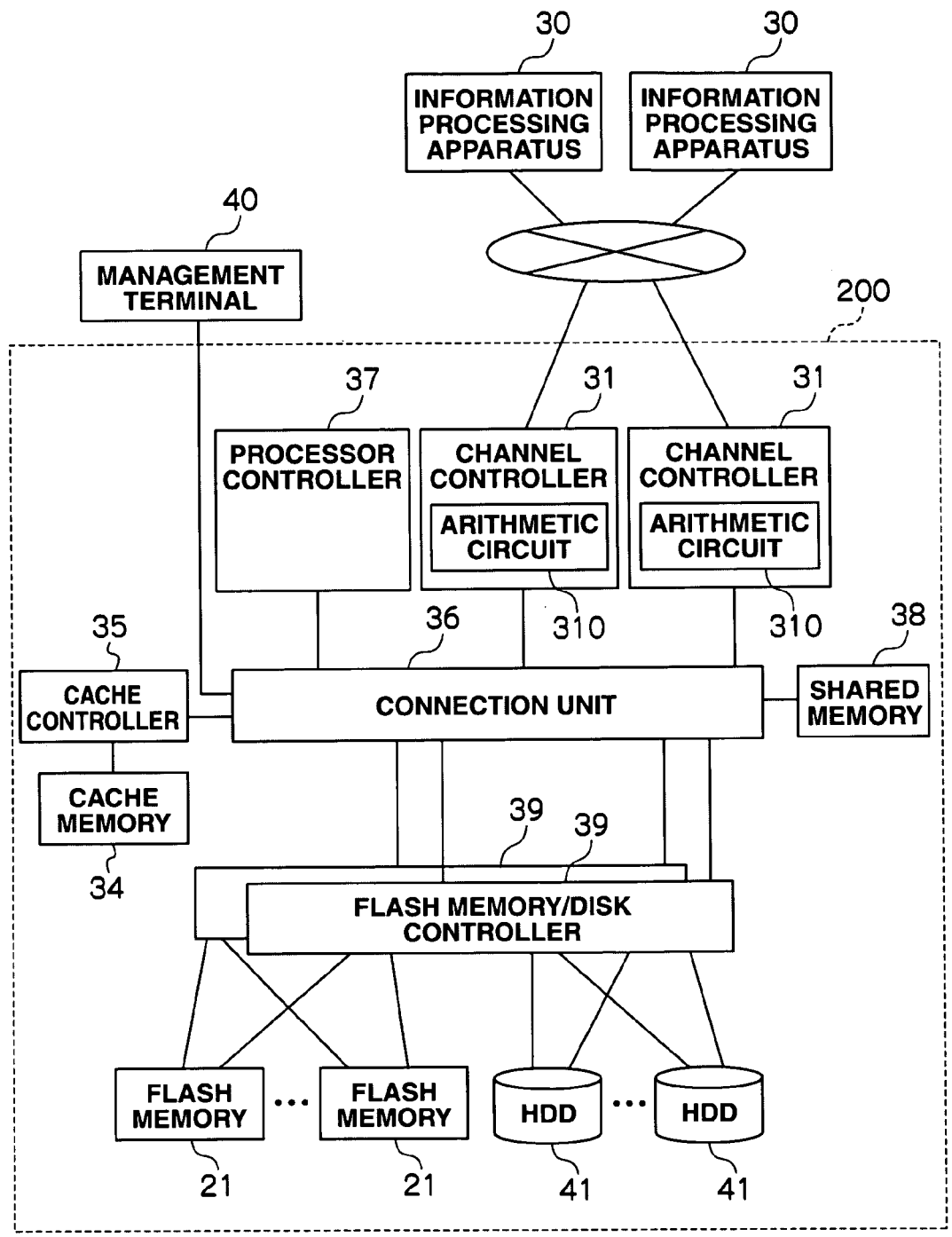
FIG. 21 is a block diagram showing the storage system according to the second embodiment.

The system configuration of the storage system 200 according to this embodiment, as shown in FIG. 21, comprises a flash memory/disk controller 39, which is an integration of the flash memory controller 33 and the disk controller 32 explained in the storage system 1 of the first embodiment.

The flash memory/disk controller 39 is a third memory device controller that controls the I/O of data D1-D4 to and from the flash memories 21, and controls the I/O of parity data P to and from the hard disk drives 41.

In this embodiment, SAS is used as the interface of the flash memory/disk controller 39 and the flash memories 21, and the interface of the flash memory/disk controller 39 and the hard disk drives 41. The controller can be integrated as a result of using the same protocol for the access of the flash memory 21 and the hard disk drive 41. Consequently, costs can be reduced and management can be simplified upon creating the storage system 200.

Figure 22:
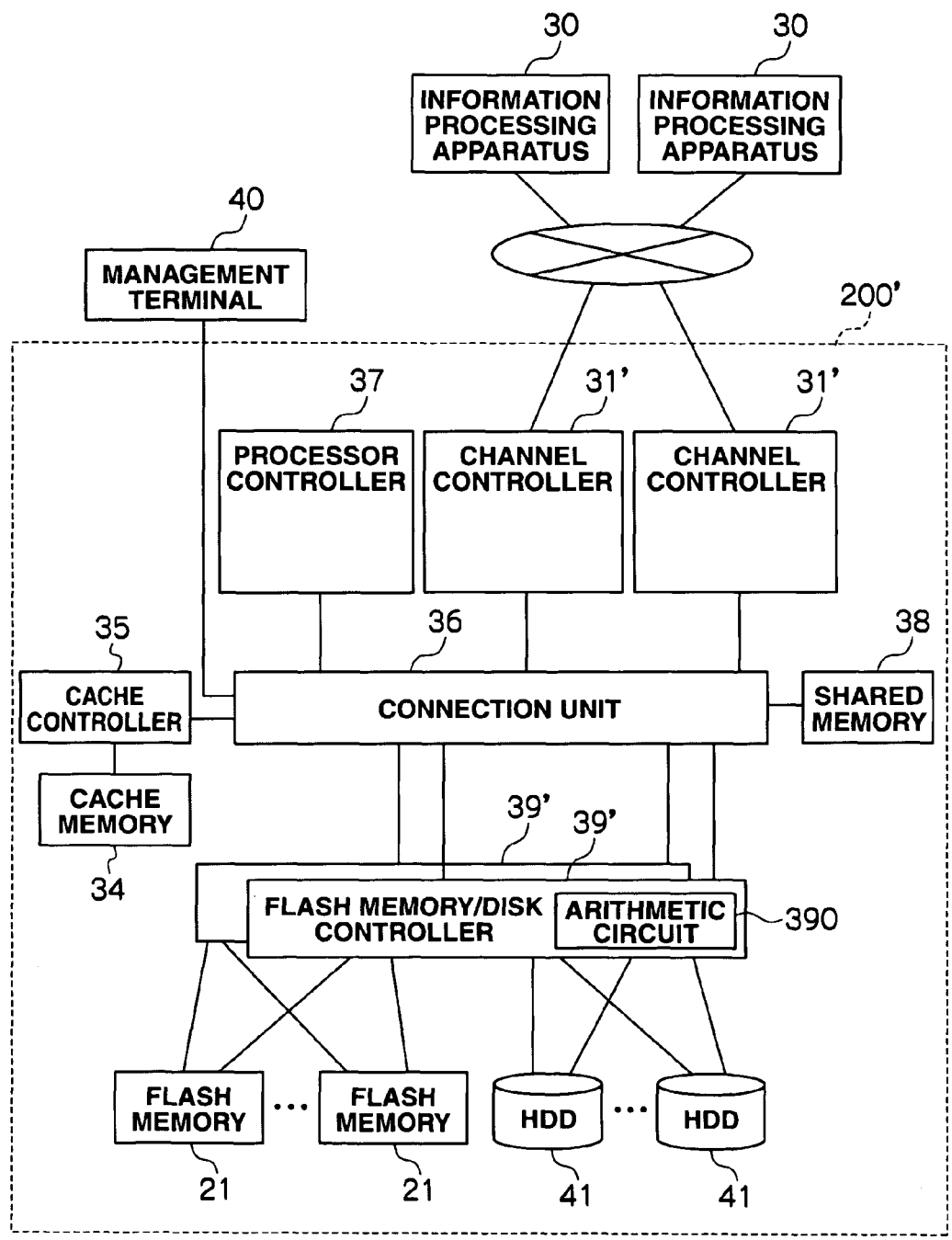
FIG. 22 is a block diagram showing a modified example of the storage system according to the second embodiment.

Here, as with the storage system 200' shown in FIG. 22, the flash memory/disk controller 39' may retain the arithmetic circuit 390. In the modified example of the first embodiment explained with reference to FIG. 15, the reading of data from the cache memory 34 needed to be performed twice in the disk controller 32 and the flash memory controller 33. Nevertheless, with the modified example of this embodiment, since the disk controller 32 and the flash memory controller 33 are configured integrally, the reading of data from the cache memory 34 only needs to be performed once. The storage system 200' will not affect the transaction between the information processing apparatus 30 and the channel controller 31.

Incidentally, the other constituent features are the same as the constituent features explained in the first embodiment, and the explanation thereof is omitted. The same reference numeral assigned in the first embodiment is given to the components that are the same as the components explained in the first embodiment.

(2-2) Write Processing

The write processing of how to store the data D1-D4 in the flash memory 21 and how to store the parity data P in the hard disk drive 41 is now explained. The write processing is executed by the processor controller 37 based on the write program 381.

Figure 23:
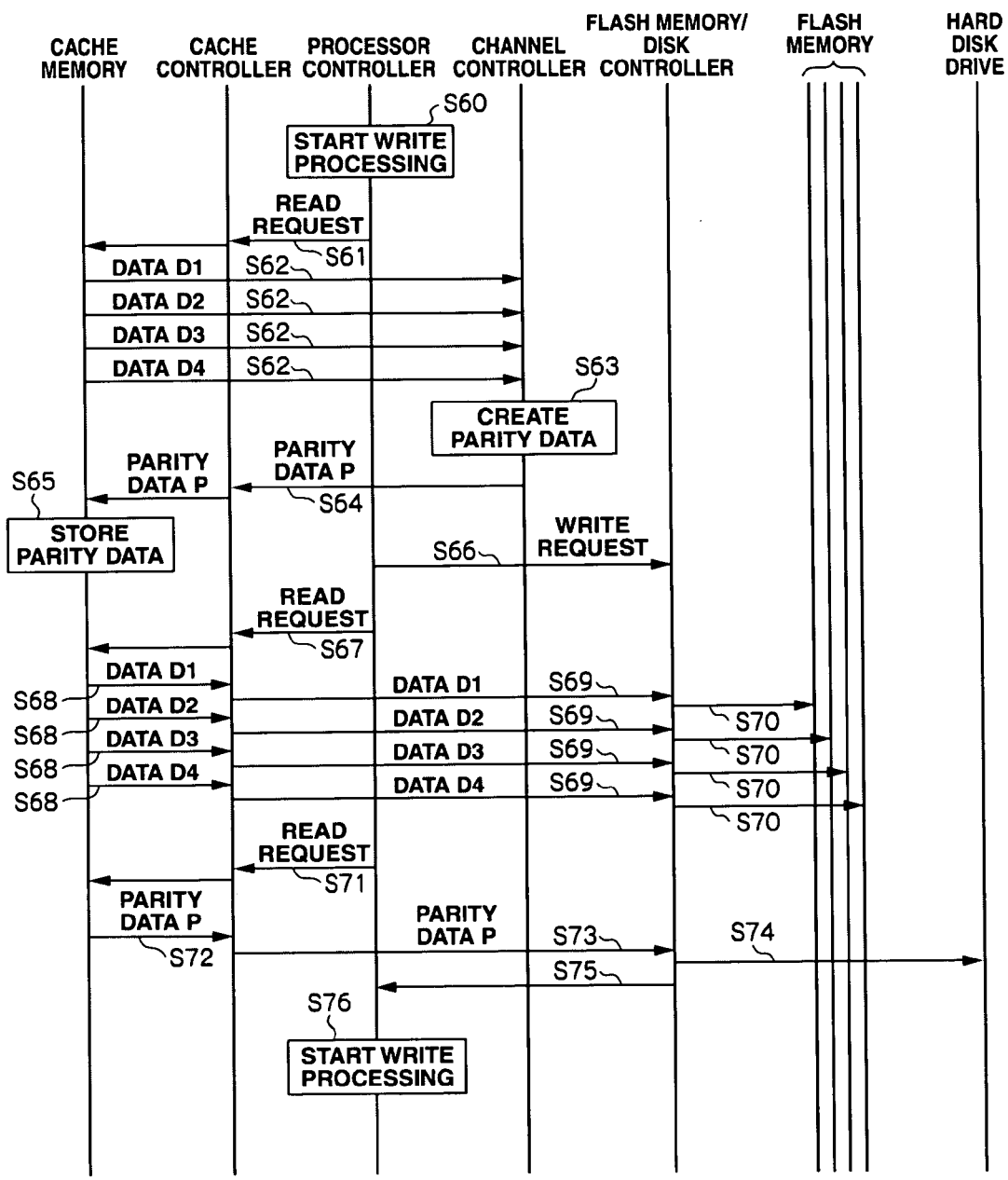
FIG. 23 is a flowchart showing the write processing according to the second embodiment.

As shown in FIG. 23, the processor controller 37 executes the processing from step S60 to step S75 according to the same routine as the processing from step S0 to step S15. However, regarding step S6, step S9, and step S13 where the processor controller 37 issued commands respectively to the flash memory controller 33 and the disk controller 32, such commands shall be collectively issued to the flash memory/disk controller 39 (S66, S69, S73).

When the processor controller 37 receives a completion report from the flash memory/disk controller 39 (S75), it ends the write processing (S76).

In the write processing of this embodiment, the transfer destination address of the data commanded by the processor controller 37 differs from the write processing explained in the first embodiment. Even when the controllers are integrated into a single flash memory/disk controller 39, it is still possible to sort the storage so that the host data is stored in the flash memory and the parity data is stored in the hard disk drive. Thereby, since data can be read from a flash memory having a fast read response and parity data that is updated each time such data is updated can be stored in a hard disk with an unlimited write count, the system performance will improve.

(2-3) Effect of Present Embodiment

According to the present embodiment, life of the system can be extended by mounting a flash memory having a fast read response on the storage system and limiting the write count of the flash memory.

(3) Other Embodiments

Although SAS was used as the interface of the flash memory controller and the flash memory and as the interface of the disk controller and the hard disk drive in the first embodiment, it is also possible to use SAS as the interface of the flash memory controller and the flash memory, and use a fibre channel as the interface of the disk controller and the hard disk drive. Since a high performance protocol can be used by adopting the fibre channel, the write performance can be improved.

Although the processor controller issued a command to the respective controllers in the storage system 1, this is merely an example, and for instance a microprocessor in the channel controller 31 may issue a command to the respective controllers.

Although SAS was used as the interface of the flash memory/disk controller and the flash memory and as the interface of the flash memory/disk controller and the hard disk drive in the second embodiment, the configuration is not limited to a SAS interface so as long as the same protocol is used for accessing the flash memory and the hard disk drive.

The present invention can be broadly applied to a plurality of storage systems and storage systems of various other modes.

What is claimed is:

1. A storage system comprising:
  a first memory device configured to store data sent from a host system;
  a first memory device controller configured to control read/write access of the data from/to the first memory device;
  an arithmetic circuit unit configured to calculate parity data based on the data;
  a second memory device configured to store the parity data; and
  a second memory device controller configured to control read/write access of the parity data from/to the second memory device;
  wherein read access speed of the first memory device is faster than read access speed of the second memory device.

2. The storage system according to claim 1, wherein the first memory device controller and the second memory device controller are physically integrated.

3. The storage system according to claim 1,
  wherein a plurality of the second memory devices are provided; and
  wherein the second memory device controller distributively stores the parity data calculated with the arithmetic circuit unit in a storage area of the plurality of second memory devices.

4. The storage system according to claim 1,
  wherein the arithmetic circuit unit is provided in the second memory device controller.

5. The storage system according to claim 1,
  wherein the first memory device is a flash memory.

6. A method of storing data in a storage system, comprising the steps of:
  storing, under control of a first controller, data sent from a host system in a first memory device;
  calculating, under control of an arithmetic circuit, parity data based on the data; and
  storing, under control of a second controller, the parity data in a second memory device, wherein read access speed of the first memory device is faster than read access speed of the second memory device.

7. The method of storing date in a storage system according to claim 6,
  wherein the first memory device controller and the second memory device controller are physically integrated.

8. The method of storing data in a storage system according to claim 6,
  wherein a plurality of the second memory devices are provided; and
  wherein the data storage method further comprises a step of the second memory device controller distributively storing the parity data calculated with the arithmetic circuit unit in a storage area of the plurality of second memory devices.

9. The method of storing data in a storage system according to claim 6,
  wherein the arithmetic circuit unit is provided in the second memory device controller.

10. The method of storing data in a storage system according to claim 6,
  wherein the first memory device is a flash memory.

* * * * *